US012603801B2

(12) United States Patent
Zu et al.

(10) Patent No.: US 12,603,801 B2
(45) Date of Patent: \*Apr. 14, 2026

(54) SIGNAL PROCESSING METHOD AND DEVICE FOR A MEMORY SYSTEM INTERFACE CIRCUIT

(71) Applicant: MONTAGE TECHNOLOGY (KUNSHAN) CO., LTD., Suzhou (CN)

(72) Inventors: Qiuyan Zu, Suzhou (CN); Chunlai Sun, Suzhou (CN); Wuguang Wang, Suzhou (CN); Gang Yan, Suzhou (CN); Yong Wang, Suzhou (CN)

(73) Assignee: MONTAGE TECHNOLOGY (KUNSHAN) CO., LTD., Suzhou (CN)

( * ) Notice: Subject to any disclaimer, the term of this patent is extended or adjusted under 35 U.S.C. 154(b) by 53 days.

This patent is subject to a terminal disclaimer.

(21) Appl. No.: 18/690,747

(22) PCT Filed: Mar. 16, 2023

(86) PCT No.: PCT/CN2023/081902
§ 371 (c)(1),
(2) Date: Mar. 11, 2024

(87) PCT Pub. No.: WO2023/193587
PCT Pub. Date: Oct. 12, 2023

(65) Prior Publication Data
US 2024/0388475 A1     Nov. 21, 2024

(30) Foreign Application Priority Data
Apr. 4, 2022     (CN) .......................... 202210352338.8

(51) Int. Cl.
*H04L 25/03* (2006.01)
*H04L 5/00* (2006.01)

(52) U.S. Cl.
CPC ...... *H04L 25/03057* (2013.01); *H04L 5/0048* (2013.01); *H04L 25/03949* (2013.01)

(58) Field of Classification Search
CPC ......... H04L 25/03057; H04L 25/03949; H04L 2025/0349
(Continued)

(56) References Cited

U.S. PATENT DOCUMENTS 3,974,449 A    8/1976  Falconer
5,394,110 A    2/1995  Mizoguchi
(Continued)

FOREIGN PATENT DOCUMENTS

CN         1500314 A      5/2004
CN      101098418 A      1/2008
(Continued)

OTHER PUBLICATIONS

International Search Report for PCT/CN2023/081902, mailed on Jun. 15, 2023.

*Primary Examiner* — Leila Malek
(74) *Attorney, Agent, or Firm* — Junhe Law Office P.C.; James J. Zhu

(57) ABSTRACT

A signal processing method for a memory system interface circuit is provided. The memory system interface circuit comprises at least one signal pin each being configured to receive a transmission signal via an individual signal link and to generate a received signal at a receiving node of the signal link. The signal processing method comprises: pre-processing the received signal to obtain an input signal; removing a weighted feedback signal from the input signal to obtain an output signal, wherein the weighted feedback signal is provided by a finite impulse response (FIR) filter in a feedback path; deciding on the output signal based on a predetermined base signal to generate a digital output signal;

(Continued)

weighting, on a scale of a filter coefficient matrix of the FIR filter, the digital output signal to obtain the weighted feedback signal; comparing the output signal with a reference signal to generate an error signal; and determining a set of optimal filter coefficients of the filter coefficient matrix of the FIR filter and the reference signal according to correlation between the digital output signal and the error signal, to minimize inter-symbol interference (ISI) of the received signal introduced by transmission characteristics of the signal link.

22 Claims, 4 Drawing Sheets

(58) Field of Classification Search
USPC ......................................................... 375/233
See application file for complete search history.

(56) References Cited

U.S. PATENT DOCUMENTS

| | | | | |
|---|---|---|---|---|
| 9,455,847 B1* | 9/2016 | Chung | ................ | H04L 27/0014 |
| 10,230,359 B1* | 3/2019 | Mattia | .................... | H03K 5/086 |
| 2007/0258517 A1* | 11/2007 | Rollings | ........... | H04L 25/03057 |
| | | | | 375/233 |
| 2008/0219324 A1* | 9/2008 | Park | ..................... | H04B 1/7143 |
| | | | | 375/E1.035 |
| 2008/0240293 A1* | 10/2008 | Kim | ..................... | H04N 21/236 |
| | | | | 375/229 |
| 2017/0091516 A1* | 3/2017 | Xu | .......................... | G01R 13/02 |
| 2020/0076652 A1* | 3/2020 | Shi | ...................... | G06F 13/1689 |

FOREIGN PATENT DOCUMENTS

| | | |
|---|---|---|
| CN | 103338171 A | 10/2013 |
| CN | 103401821 A | 11/2013 |

* cited by examiner

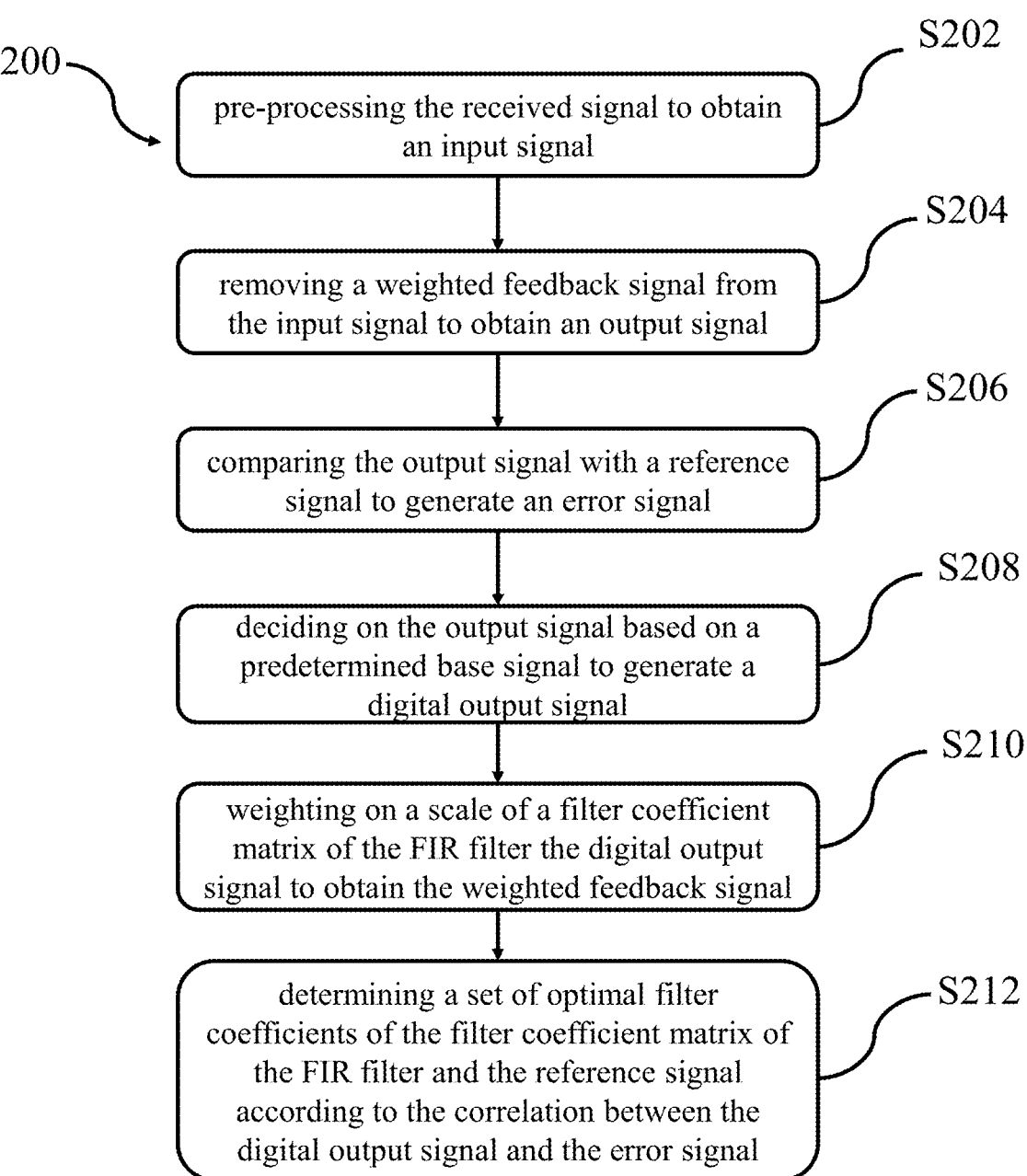

200 pre-processing the received signal to obtain an input signal — S202 removing a weighted feedback signal from the input signal to obtain an output signal — S204 comparing the output signal with a reference signal to generate an error signal — S206 deciding on the output signal based on a predetermined base signal to generate a digital output signal — S208 weighting on a scale of a filter coefficient matrix of the FIR filter the digital output signal to obtain the weighted feedback signal — S210 determining a set of optimal filter coefficients of the filter coefficient matrix of the FIR filter and the reference signal according to the correlation between the digital output signal and the error signal — S212

Fig. 2

SIGNAL PROCESSING METHOD AND DEVICE FOR A MEMORY SYSTEM INTERFACE CIRCUIT

TECHNICAL FIELD

The present application generally relates to signal processing technology, and more particularly, to a signal processing method and device for a memory system interface circuit.

BACKGROUND OF THE INVENTION

In double data rate (DDR) memory systems, signal integrity of single-ended signals, whether command/address signals or data signals, is becoming a limitation for improving the speed of signal communication, because they are easily influenced by crosstalk and reflection due to impedance mismatch. When the requirement on the performance of data storage becomes higher, it is required to increase a data access rate for a data storage link. However, a limited width of a transmission channel may lead to severe inter-symbol interference (ISI) for high-frequency data communication. In order to address this issue, the DDR5 standard adds decision feedback equalization (DFEs) at receiving side to improve signal integrity.

However, filter coefficients of the DFE rely on a calibration result generated at an initialization process of a memory system. An existing calibration method is, through sweeping, searching for an optimal set of filter coefficients using an optimized eye-diagram as an evaluation standard. This calibration process requires the full involvement of a memory controller, which is very time consuming. Furthermore, the initialization of the computer system requires calibrating a lot of hardware components, with a very limited time allocated to the calibration of its memory system. Therefore, the limited time of initialization cannot ensure that the DFEs can be calibrated well.

Therefore, there is a need for an improved signal processing method and mechanism to reduce the calibration time for DFEs.

SUMMARY OF THE INVENTION

An objective of the present application is to provide a signal processing method for a memory system interface circuit, which can realize coefficient configuration of a decision feedback equalizer in a fast and accurate manner.

According to an aspect of the present application, a signal processing method for a memory system interface circuit is provided. The memory system interface circuit comprises at least one signal pin each being configured to receive a transmission signal via an individual signal link and to generate a received signal at a receiving node of the signal link. The signal processing method comprises: pre-processing the received signal to obtain an input signal; removing a weighted feedback signal from the input signal to obtain an output signal, wherein the weighted feedback signal is provided by a finite impulse response (FIR) filter in a feedback path; deciding on the output signal based on a predetermined base signal to generate a digital output signal; weighting, on a scale of a filter coefficient matrix of the FIR filter, the digital output signal to obtain the weighted feedback signal; comparing the output signal with a reference signal to generate an error signal; and determining a set of optimal filter coefficients of the filter coefficient matrix of the FIR filter and the reference signal according to correlation between the digital output signal and the error signal, to minimize inter-symbol interference (ISI) of the received signal introduced by transmission characteristics of the signal link.

In some embodiments, the pre-processing further comprises continuous time linear equalization, variable gain adjustment or the combination thereof.

In some embodiments, determining a set of optimal filter coefficients of the filter coefficient matrix of the FIR filter and the reference signal according to correlation between the digital output signal and the error signal further comprises: determining whether to update the reference signal according to signs of the digital output signal and the error signal at a current time moment; and updating the reference signal at a predetermined reference step according to an indication to update the reference signal.

In some embodiments, updating the reference signal at a predetermined reference step further comprises: determining the reference signal using least mean square algorithm or sign-sign least mean square algorithm according to the digital output signal and the error signal.

In some embodiments, determining the reference signal using sign-sign least mean square algorithm further comprises updating the reference signal using the following equation: $dLev_{n+1}=dLev_n+u_{dLev}*sign(e_n)*sign(d_n)$, wherein $dLev_{n+1}$ is an updated reference signal at the current time moment, $dLev_n$ is the reference signal before updating at the current time moment, $u_{dLev}$ is the predetermined reference step, $e_n$ is a value of the error signal at the current time moment, $d_n$ is a value of the digital output signal at the current time moment, and sign( ) refers to a mathematical sign function.

In some embodiments, the FIR filter comprises m stages, and m is a positive integer, and wherein determining a set of optimal filter coefficients of the filter coefficient matrix of the FIR filter and the reference signal according to correlation between the digital output signal and the error signal further comprises: determining signs of ISI at k time moments prior to the current time moment according to correlation between a sign of the error signal at a current time moment and signs of the digital output signal at k time moments prior to the current time moment, and determining whether or not to update a filter coefficient of a $k^{th}$ stage of the FIR filter according to the determination of the signs of ISI at k time moments prior to the current time moment, wherein k is a positive integer smaller than or equal to m; and updating the filter coefficient of the $k^{th}$ stage at a predetermined filter step according to an indication to update the filter coefficient of the $k^{th}$ stage.

In some embodiments, updating the filter coefficient of the $k^{th}$ stage at a predetermined filter step further comprises: determining the filter coefficient of the $k^{th}$ stage using least mean square algorithm or sign-sign least mean square algorithm according to the digital output signal and the error signal.

In some embodiments, determining the filter coefficient of the $k^{th}$ stage using sign-sign least mean square algorithm further comprises updating the filter coefficient using the following equation: $w[k]_{n+1}=w[k]_n+u_{dfe}*sign(e_n)*sign(d_{n-k})$, wherein $w[k]_{n+1}$ is an updated filter coefficient of the $k^{th}$ stage at the current time moment, $w[k]_n$ is the filter coefficient of the $k^{th}$ stage before updating at the current time moment, $u_{dfe}$ is the predetermined filter step, $e_n$ is a value of the error signal at the current time moment, $d_{n-k}$ is a value of the digital output signal at k time moments prior to the current time moment, and sign( ) refers to a mathematical sign function.

In some embodiments, the transmission signal is a randomly generated signal or a pseudo random sequence.

In some embodiments, the method is repeated at a predetermined time interval to re-determine the set of optimal filter coefficients of the filter coefficient matrix of the FIR filter and the reference signal.

In some embodiments, the memory system interface circuit is integrated in a memory interface of a memory controller.

In some embodiments, the memory system interface circuit is integrated in an interface of a memory module.

In some embodiments, the method can be implemented repeatedly at a predetermined interval, to redetermine a set of optimal filter coefficients of the filter coefficient matrix of the FIR filter and the reference signal. Since the time for one calibration of the DFE is short enough, the system may also implement the calibration every period of time to redetermine the set of optimal filter coefficients of the filter coefficient matrix of the FIR filter, thereby compensating a drift of the DFE coefficients due to the variation of temperature or voltage.

In another aspect of the present application, a signal processing device for a memory system interface circuit is provided. The memory system interface circuit comprises at least one signal pin each being configured to receive a transmission signal via an individual signal link and to generate a received signal at a receiving node of the signal link. The signal processing device comprises: a pre-processing module configured for pre-processing the received signal to obtain an input signal; a decision feedback equalizer (DFE) comprising an output path coupled with an output sampler and a feedback path coupled with a finite impulse response (FIR) filter; the DFE being configured for removing a weighted feedback signal from the input signal to obtain an output signal, and the output sampler being configured for deciding on the output signal based on a predetermined base signal to generate a digital output signal; wherein the weighted feedback signal is obtained by weighting on a scale of a filter coefficient matrix of the FIR filter the digital output signal; an error sampler configured for comparing the output signal with a reference signal to generate an error signal; and an adaptive processing module configured for determining a set of optimal filter coefficients of the filter coefficient matrix of the FIR filter and the reference signal according to correlation between the digital output signal and the error signal, to minimize inter-symbol interference (ISI) of the received signal introduced by transmission characteristics of the signal link.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain the principles of the invention.

BRIEF DESCRIPTION OF DRAWINGS

The drawings referenced herein form a part of the specification. Features shown in the drawing illustrate only some embodiments of the application, and not of all embodiments of the application, unless the detailed description explicitly indicates otherwise, and readers of the specification should not make implications to the contrary.

FIG. 2 illustrates a signal processing method for a memory system interface circuit according to an embodiment of the present application.

The same reference numbers will be used throughout the drawings to refer to the same or like parts.

DETAILED DESCRIPTION OF THE INVENTION

The following detailed description of exemplary embodiments of the application refers to the accompanying drawings that form a part of the description. The drawings illustrate specific exemplary embodiments in which the application may be practiced. The detailed description, including the drawings, describes these embodiments in sufficient detail to enable those skilled in the art to practice the application. Those skilled in the art may further utilize other embodiments of the application, and make logical, mechanical, and other changes without departing from the spirit or scope of the application. Readers of the following detailed description should, therefore, not interpret the description in a limiting sense, and only the appended claims define the scope of the embodiment of the application.

Figure 1:
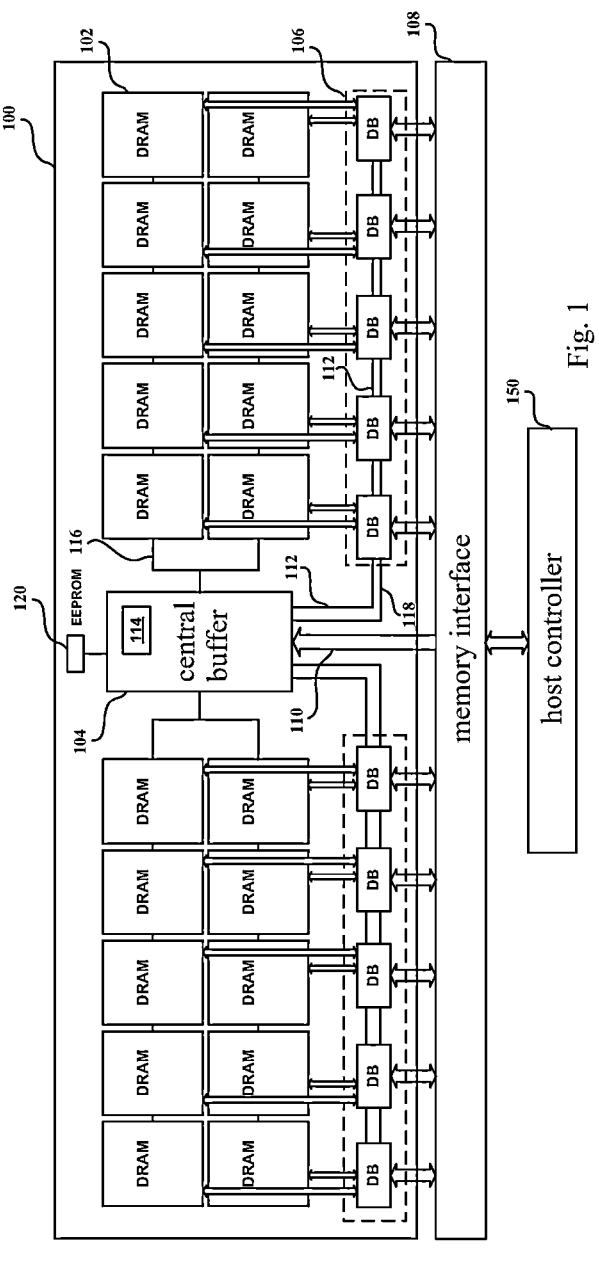
FIG. 1 illustrates a memory system according to an embodiment of the present application.

FIG. 1 illustrates a memory system 100 according to an embodiment of the present application. In some embodiments, the memory system 100 may be a memory system that conforms to the JEDEC double data rate synchronous dynamic random access memory (SDRAM) standard, such as JEDEC DDR, DDR2, DDR3, DDR4, DDR5, and other double data rate standards. In addition, the memory system 100 may also be an internal memory that conforms to other standards or protocols, such as RAMBUS internal memory, or may be a memory that conforms to future memory standards or protocols.

As shown in FIG. 1, the memory system 100 includes a plurality of memory modules 102 (exemplarily illustrated as DRAM in the figure), wherein each memory module 102 includes a plurality of memory cells which are arranged in an array. In some embodiments, the memory module may include a volatile memory (such as dynamic random access memory), non-volatile memory (flash memory, such as NAND or NOR flash memory), or a combination of both volatile and non-volatile memories. In other embodiments, the memory module may also be a new type of memory manufactured using different processes, including but not limited to: magnetoresistive memory, phase-change memory, resistive memory, semi-floating gate memory, or any other type of memory. It should be noted that the memory module described herein may be a single memory chip, or may include two or more memory chips. In the memory system 100 shown in FIG. 1, a plurality of memory modules 102 are arranged into two groups of memory modules, and each group of memory modules constitutes a memory rank of the memory system 100 to store data.

The memory system 100 also includes a central buffer 104 and a data buffer (DB) 106. In some embodiments, the central buffer 104 may be a registering clock driver (RCD). Specifically, the central buffer 104 is coupled to a host controller 150 and receives access commands each including a target address and an access type via the memory interface 108. The access command may be a control command to access (such as, to read or to write) one or more target addresses in the memory module 102. The data buffer 106 is further coupled to a host controller 150 via a memory interface 108, to receive an access command and/or data to be written into the memory system 100 from the host controller 150, or send data read from the memory system 100 to the host controller 150. In some embodiments, the central buffer 104 receives an access command via the command/address (C/A) bus 110. The central buffer 104 is also coupled to each memory module 102 via a memory control bus 116 to control these memory modules 102 to write or to read data via the data buffer 106.

The data buffer 106 is coupled between the memory module 102 and the memory interface 108 to exchange data therebetween. For example, the data stored in the memory module 102 can be read out and sent to the memory interface 108 via the data buffer 106, or the data received from the memory interface 108 via the data buffer 106 can be written into the corresponding memory cell(s) in the memory module. The data buffer 106 includes a plurality of submodules (for example, 10 submodules shown in the embodiment in FIG. 1), and each submodule is coupled to the corresponding two memory modules 102. The data buffer 106 including a plurality of submodules arranged in parallel can increase a data access bandwidth of the memory system 100. It can be understood that the present application does not limit the amount of submodules of the data buffer 106.

The memory interface 108 has a plurality of signal pins. A portion of the signal pins are coupled to the central buffer 104, and another portion of the signal pins are coupled to the data buffers 106. It can be appreciated that high-frequency (e.g., 1600 MHZ, 2666 MHZ, 3200 MHZ or even higher) digital signals may be transmitted on these signal pins, and thus inter-symbol interference (ISI) may exist during signal transmission, which needs to be removed using specific signal processing technologies.

According to an aspect of the present application, a signal processing method is provided, which can be used in an interface circuit of a memory system, such as an interface circuit of a memory controller. For example, the signal processing method may be used in the memory interface 108 of the central buffer 104 and/or the data buffers 106. As aforementioned, each of the signal pins included in the memory interface may receive a transmission signal provided by an external controller (e.g., the host controller 150 shown in FIG. 1) via an individual signal link (i.e., an amount of the signal links may be equal to that of the signal pins), and may generate a received signal at the receiving node of the signal link. In addition, the signal processing method may be used in other interface circuits in the memory system, such as an interface circuit for the memory module 102, which is a signal link between the data buffer 106 and the memory module 102, or used in the interface circuit 112 between the data buffer 106 and the central buffer 104 and the interface circuit 116 between the central buffer 104 and the memory module 102. It can be appreciated that although the processing of the signal processing method of the present application is exemplarily described with reference to a memory system, the signal processing method can be used in interface circuits of various other types of circuits such as SERDES circuits.

Figure 3:
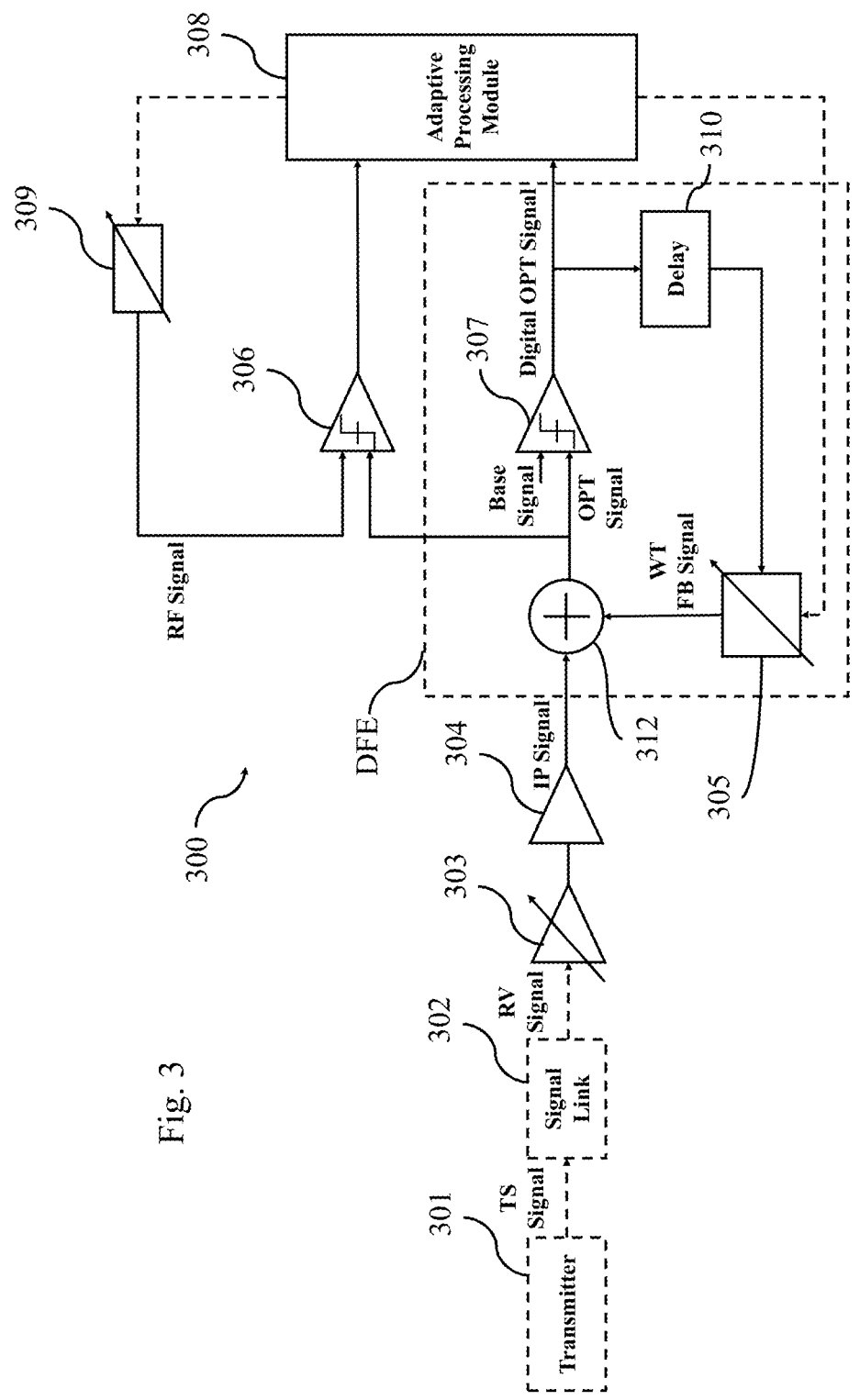
FIG. 3 illustrates a signal processing device for a memory system interface circuit according to an embodiment of the present application.

FIG. 2 illustrates a signal processing method 200 for a memory system interface circuit according to an embodiment of the present application, and FIG. 3 illustrates a signal processing device 300 for a memory system interface circuit according to an embodiment of the present application, which can be used to implement the signal processing method 200 shown in FIG. 2. In some embodiments, the signal processing device 300 may be, for example, integrated within a corresponding interface circuit, such as an interface circuit of a memory controller. It can be appreciated that since multiple signal pins may be included in an interface circuit, each of the signal pins may have an individual signal processing device 300. Preferably, some modules of the signal processing devices 300 for the respective signal pins may be integrated together.

In the following, the signal processing method and device of the present application will be elaborated with reference to the embodiments shown in FIGS. 2 and 3.

As shown in FIGS. 2 and 3, a transmission signal from a transmitter 301 (e.g., the host controller 150 shown in FIG. 1) may be transmitted via a signal transmission link 302 to a receiving node of a signal pin of an interface circuit. Due to inherent transmission characteristics of the signal link 302, the transmission signal from the transmitter may be inevitably influenced by certain factors such as inter-symbol interference (ISI), which may deteriorate a received signal received at a receiving node of the signal link 302. Especially, the ISI may increase a bit error rate (BER) at the receiving node, which is harmful to the circuit system that works at a high frequency.

Specifically, the signal processing method 200 begins at step S202. The received signal received at the receiving node is pre-processed to obtain an input signal. Optionally, the pre-processing may not include any special processing to ISI, which can be addressed in a later step. In some embodiments of the present application, the pre-processing performed in step S202 may include continuous time linear equalization by a continuous time linear equalizer (CTLE) 303, and variable gain adjustment by a variable gain amplifier (VGA) 304 such as signal amplification and so on. Optionally, only the aforementioned continuous time linear equalization or the variable gain adjustment processing may be performed in step S202. It can be appreciated that other types of pre-processing also may be performed in step S202 of the signal processing method 200, depending on actual requirements. The signal generated after the one or more types of pre-processing to the received signal may be used as the input signal for a decision feedback equalizer (DFE).

Next, in step S204, the input signal is processed by the DFE to obtain an output signal. Specifically, the DFE may remove a weighted feedback signal from the input signal. More details of the weighted feedback signal will be elaborated below. As shown in FIG. 3, the DFE includes a filter 305 and an adder 312. The filter 305 has a filter coefficient matrix which is coupled in a feedback path of the DFE and further coupled to the adder 312. In some embodiments, the filter coefficient matrix may include multiple stages. Each stage may feed back to the adder 312 its received output signal (processed by a sampler 306 and a delay module 310, which will be elaborated below) using a configurable filter coefficient. Therefore, the adder 312 may remove the feedback signals from the input signal. In this way, interferences (especially ISI) in the output signal outputted by the DFE can be processed, and thus the ISI in the input signal can be at least partially removed. In practical applications, the filter 305 may be a finite impulse response (FIR) filter, which can generate the output signal that is equal to or close to a target signal by adjusting one or more filter coefficients of the filter coefficient matrix. As will be described below in more details, each filter coefficient of the filter coefficient matrix of the filter 305 may be adjusted according to a digital output signal that is previously decoded and the correlation between the digital output signal and an error signal, and the adjusting process can be performed in a pre-calibration process of the DFE.

In step 206, the output signal is provided to an error sampler 306 and compared with a reference signal received by the error sampler 306 to generate the error signal. In some embodiments, the reference signal is obtained by performing an averaging operation or other similar statistical operation on an analog voltage of symbol "1" in the output signal by the adder 312. Therefore, the reference signal may change with the analog voltage of symbol "1" in the received signal. It is expected that the reference signal may converge to a constant value or fluctuate within a range. In some embodiments, it may be determined whether or not to update the reference signal according to symbols of the digital output signal and the error signal at a current time moment.

In step 208, the output signal is also provided to an output sampler 307, and decided by the output sampler 307 according to a predetermined base signal to generate the digital output signal. Still referring to FIG. 3, the output sampler 307 is coupled in an output path of the DFE, and the output signal of the adder 312 may be received and processed by the output sampler 307. In some embodiments, the output sampler 307 may be a 1-bit quantizer. In some embodiments, the output sampler 307 receives the predetermined base signal (not shown, which may be a base signal with a fixed voltage level), and compares the output signal with the predetermined base signal to make a decision such as "0" or "1" on the output signal. It can be appreciated that in some other embodiments the output sampler 307 may be a multi-bit quantizer which may be implemented as an analog to digital converter. The decision result by the output sampler 307 may be a digital signal, which is referred to as the digital output signal in the context of the present application. In other words, the output sampler 307 converts the output signal in an analog signal format into the digital output signal in a digital signal format. Accordingly, the predetermined base signal may be a reference voltage level that is in compliance with the memory system. The signals generated by the error sampler 306 and the output sampler 307 are both digital signals, which may be provided to an adaptive processing module 308 for further processing.

As aforementioned, the adder 312 may receive the weighted feedback signal from the filter 305 and remove such signal from the input signal. Step S210 is used to generate the weighted feedback signal. In step S210, the filter coefficient matrix of the filter 306 weights the digital output signal to generate the weighted feedback signal. The weighted feedback signal is provided to the adder 312 for the filter processing of the input signal. Specifically, the filter 305 may receive the digital output signal applied with a predetermined delay by the delay module 310, and weight the delayed digital output signal using a set of filter coefficients. In some embodiments, the delay module 310 may include multiple delay submodules, and the filter coefficient matrix also includes multiple stages as respective feedback sub-paths. Each delay submodule may be corresponding to a feedback sub-path, to delay the received digital output signal by a predetermined delay and then provide it to a feedback sub-path coupled thereto. The feedback sub-path may further provide the delayed digital output signal to the adder 312. For example, each delay submodule may delay the received digital output signal by one or more cycles, and thus the adjacent bits of the digital output signal may be provided to the filter 305 together.

Next, in step S212, the adaptive processing module 308 may determine a set of optimal filter coefficients of the filter coefficient matrix of the filter 305 and the reference signal according to correlation between the digital output signal provided by the output sampler 307 and the error signal provided by the error sampler 306. In some embodiments, the adaptive processing module 308 may be implemented as a FPGA device or other signal processing device, which can perform a specific adaptive processing algorithm by loading in a specific program/codes.

In the embodiment shown in FIG. 3, two "loops" where the adaptive processing module 308 is located is illustrated. An upper "loop" involving the adaptive processing module 308 includes the error sampler 306, the adaptive processing module 308 and the digital to analog converter 309, and updates the reference signal after several times/cycles of computation. The digital to analog converter 309 is used to convert the digital signal outputted by the adaptive processing module 308 into the reference signal in an analog signal format. On the other hand, a lower "loop" involving the adaptive processing module 308 includes the filter 305, the output sampler 307 and the adaptive processing module 308, which can update multiple filter coefficients of the filter coefficient matrix of the filter 305 after several times/cycles of computation. Specifically, the adaptive processing module 308 may determine whether or not to perform the update according to the correlation between the digital output signal and the error signal, and determine the direction and step for updating the filter coefficients of the filter coefficient matrix and/or the reference signal if needed. In this way, it is expected that the filter coefficients and the reference signal can converge to the optimal values after multiple times of update. When the set of optimal coefficients are configured, the ISI in the received signal introduced by the transmission characteristics of the signal link can be minimized. The "correlation" between signals used herein may be any types of applicable mathematical relations, and a computation result of the mathematical relation can characterize or measure an extent of "correlation" between the digital output signal and the error signal. The specific manner to describe the correlation is not limited thereto, as long as it can qualitatively or quantitatively describe the extent of correlation between the digital output signal and the error signal.

In some embodiments of the present application, the step S212 of determining the reference signal according to the correlation between the digital output signal and the error signal can be implemented in the following manner: determining whether to update the reference signal according to signs of the digital output signal and the error signal at a current time moment, and updating the reference signal at a predetermined reference step according to an indication to update the reference signal (i.e., it is determined to update the reference signal). In contrast, if it is determined that there is no need to update the reference signal according to the signs of the digital output signal and the error signal at the current time moment, then the reference signal can maintain at a certain value. In some conditions, if the reference signal maintains at a certain value or substantially does not change within several cycles, then it can be determined that the reference signal has converged to a certain value. The predetermined reference step generally defines a minimum resolution to increase or decrease the reference signal. A smaller reference step can help the reference signal converge to a certain value more precisely, with a longer convergence time. Therefore, there is a tradeoff between the convergence accuracy and the convergence time when determining the value of the predetermined reference step, and preferably both can be satisfied to some extent. In some embodiments of the present application, updating the reference signal at the predetermined reference step can be implemented by determining the reference signal through a least mean square (LMS) algorithm or a sign-sign least mean square (SS-LMS) algorithm according to the digital output signal and the error signal. It can be appreciated that other applicable adaptive processing algorithms may be used in the embodiments of the present application, which is known to a person skilled in the art and thus will not be elaborated.

In some embodiments of the present application, the adaptive processing module 308 may use the SS-LMS algorithm. Accordingly, the reference signal may be updated using the following equation (1).

$$dLev_{n+1} = dLev_n + u_{dLev} * \text{sign}(e_n) * \text{sign}(d_n) \quad (1)$$

wherein $dLev_{n+1}$ is an updated reference signal at the current time moment, $dLev_n$ is the reference signal before updating at the current time moment, $u_{dLev}$ is the predetermined reference step, $e_n$ is a value of the error signal at the current time moment, $d_n$ is a value of the digital output signal at the current time moment, and sign( ) refers to the sign function. For example, if $dLev_{n=8.2}$, $u_{dLev}=0.2$, $e_n=0.2$ (i.e., the output signal is greater than the reference signal) and $d_n=1$, then the updated reference signal $dLev_{n+1}=8.2+0.2*\text{sign}(0.2)*\text{sign}(1)=8.4$. In addition, in order to describe the correlation between the digital output signal and the reference signal more accurately, it can be defined that $\text{sign}(1)=1$, $\text{sign}(0)=-1$ for the digital output signal $d_n$.

In some embodiments of the present application, if the FIR filter includes m stages, and m is a positive integer, then step S212 of determining the set of optimal filter coefficients further includes the following steps: determining signs of ISI at k time moments prior to the current time moment according to correlation between a sign of the error signal at a current time moment and signs of the digital output signal at k time moments prior to the current time moment, and determining whether or not to update a filter coefficient of a $k^{th}$ stage of the FIR filter according to the determination of the signs of ISI at k time moments prior to the current time moment, wherein k is a positive integer smaller than or equal to m; and updating the filter coefficients of the $k^{th}$ stage at a predetermined filter step according to the indication to update the filter coefficients of the $k^{th}$ stage. For example, if the filter includes 6 stages, then whether or not to update the filter coefficient of the second stage of the filter may be based on the sign of the error signal at the current time moment and the signs of the digital output signal at two previous time moments before the current time moment. In some embodiments of the present application, updating the filter coefficient of the $k^{th}$ stage at the predetermined filter step may include determining the filter coefficient of the $k^{th}$ stage according to the digital output signal and the error signal using the LMS algorithm or the SS-LMS algorithm.

In some embodiments of the present application, the adaptive processing module 308 may use the SS-LMS algorithm, and accordingly, the filter coefficients may be updated in step S212 using the following equation:

$$w[k]_{n+1} = w[k]_n + u_{dfe} * \text{sign}(e_n) * \text{sign}(d_{n-k}) \quad (2)$$

wherein $w[k]_{n+1}$ is an updated filter coefficient at the current time moment, $w[k]_n$ is the filter coefficient of the $k^{th}$ stage before updating at the current time moment, $u_{dfe}$ is the predetermined filter step, $e_n$ is a value of the error signal at the current time moment, $d_{n-k}$ is a value of the digital output signal at k time moments prior to the current time moment, and sign( ) refers to the sign function. For example, if $w[3]_n=1$ $u_{dfe}=-0.1$, $e_n=0.2$ (i.e., the output signal is greater than the reference signal) and $d_{n-3}=1$, then the updated filter coefficient of the third stage $w[3]_{n+1}=1+(-0.1)*\text{sign}(0.2)*\text{sign}(1)=0.9$. In addition, in order to describe the correlation between the digital output signal and the reference signal more accurately, it can be defined that $\text{sign}(1)=1$, $\text{sign}(0)=-1$ for the digital output signal $d_{n-3}$.

In some examples, the signal processing method and device of the present application can be used in a memory system. Accordingly, the updating of the filter coefficients and the reference signal as described above may be performed at an initialization stage of the memory system. After a period of computation, the filter coefficients and the reference signal may adaptively converge to respective stable values, which may have a change less than 5% or even less than 2% between two adjacent cycles, for example. It can be appreciated that a predetermined threshold of the change such as 2% or less may be provided as a criterion for convergence. If the coefficients or the signal has a change between two adjacent cycles that is less than the predetermined threshold value, then it may be determined that the calibration is completed. In that case, a set of optimal filter coefficients and the corresponding reference signal value may be obtained, which may reflect the filter performance of the adaptive filter required to compensate for the inherent transmission characteristics of the signal link 302. It should be noted that in the context of the present application, the optimal filter coefficients and the reference signal can reduce ISI effectively, i.e., "minimize" ISI, but it does not mean that the ISI can be reduced to zero, and does not mean that the ISI can be reduced uniformly for all the signal pins. It can be appreciated by a person skilled in the art the implementation of ISI reduction based on the common understanding of DFE technologies.

It can be appreciated that, since the inherent transmission characteristics for a signal link is generally stable, it is not desired to adjust or calibrate the filter coefficients and the reference signal frequently during the operation of a memory system. In some embodiments, multiple signal pins may be calibrated sequentially or in parallel with each other.

Figure 4A:
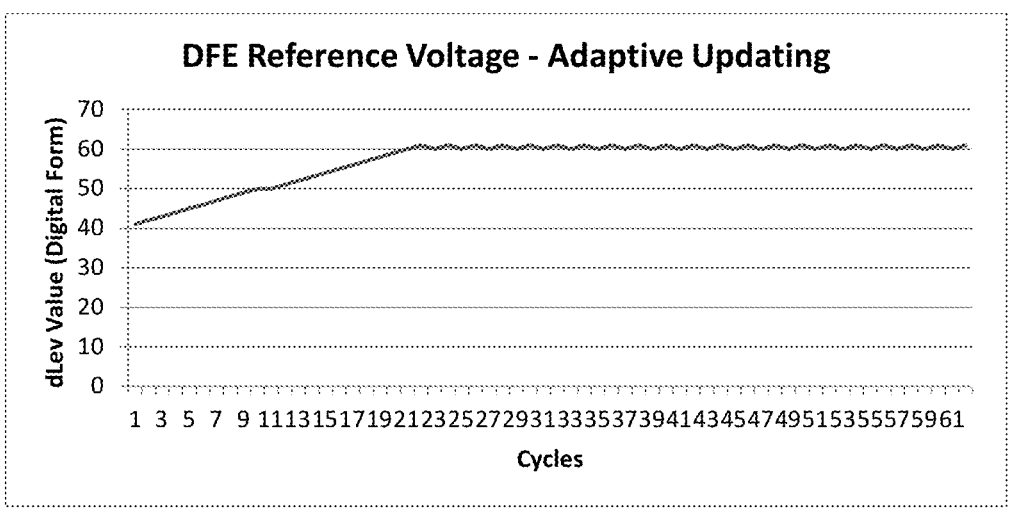
FIGS. 4a and 4b illustrate simulation of a reference signal and filter coefficients of a signal processing device according to an embodiment of the present application.
Figure 4B:
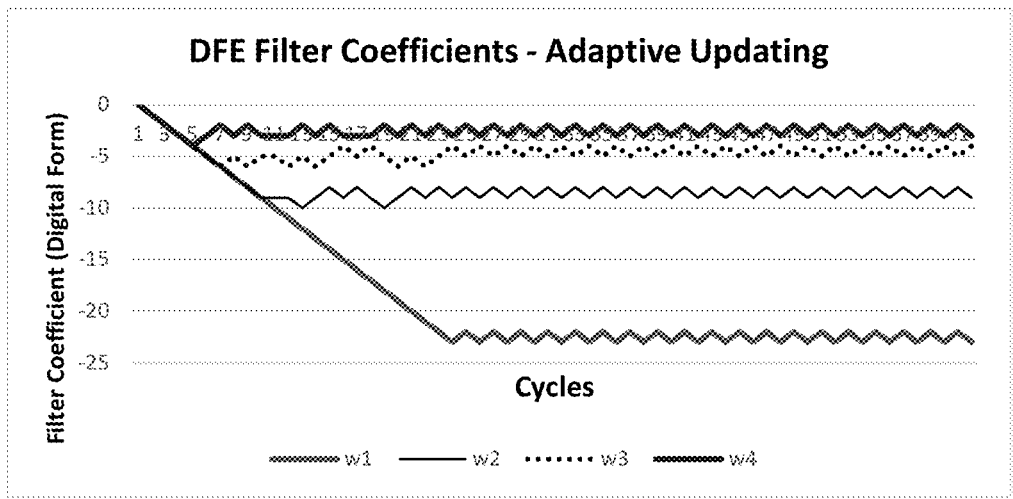

FIGS. 4a and 4b illustrate simulation of a reference signal and filter coefficients of a signal processing device according to an embodiment of the present application. 4 filter coefficients illustrated as a 4-stage filter coefficient matrix are used in the signal processing device. FIG. 4a is a curve illustrating the change of the reference signal, while FIG. 4b are four curves illustrating the changes of 4 filter coefficients. As shown in FIGS. 4a and 4b, the 4 filter coefficients and the reference signal can converge to respective optimal values after about 25 cycles of updating, which generally do not change. In practical applications, the adaptive calibration can be completed within several milliseconds. Thus, compared with conventional ways to calibrate the filter coefficients by sweeping of DFEs in a memory system, which may be completed within several seconds, the calibration time for the filter coefficient matrix according to the embodiment of the present application is reduced from several seconds to several milliseconds, which significantly reduces the time to calibrate the DFEs during the initialization.

In some embodiments of the present application, the transmission signal sent from the transmitter may be a random signal such as a Pseudo Random Binary Sequence (PRBS). Since the random signal can simulate various data combinations as many as possible, the transmission characteristics of the signal link can be more accurately characterized using such random signal instead of non-random signals. Accordingly, the resulting filter coefficients of the filter coefficient matrix of the filter can be more accurate.

In some embodiments of the present application, the signal processing method 200 shown in FIG. 2 may further include re-determining the filter coefficients of the filter according to the randomly generated signals at a predetermined interval. Since the transmission characteristics of the signal link 302 shown in FIG. 3 may still change in a long-term period due to the variation of temperature and other external conditions, it is preferred to update the filter coefficients after a long-term use. Accordingly, the steps S202 to S212 may be repeated at a predetermined interval, to maintain the resulting filter coefficients of the filter fit for the changing transmission characteristics of the signal link, and to optimize the margin of eye diagrams as much as possible.

Another aspect of the present application provides a computer-readable storage medium, in which instructions are stored. When the instructions are executed by the processor, the processor is configured to execute any of the methods for changing a dynamic range of luminance of an image above. The computer-readable medium referred to in this application include various types of computer storage medium, which can be any available medium that can be accessed by a general-purpose or special-purpose computer. For example, computer-readable medium may include RAM, ROM, EPROM, E2PROM, registers, hard disks, removable disks, CD-ROM or other optical disk memory, disk memory or other magnetic storage devices, or any other temporary or non-temporary medium which can be used to carry or store desired program code units in the form of instructions or data structures, and which can be accessed by a general-purpose or special-purpose computer, or a general-purpose or special-purpose processor. For example, the disk used in this application usually copies data magnetically, while the disk uses laser to copy data optically. The above combination should also be included in the protection scope of computer-readable medium. The exemplary storage medium is coupled to the processor such that the processor can read and write information from/to the storage medium. Alternatively, the storage medium can be integrated into the processor. The processor and storage medium can reside in the ASIC. ASIC can reside in the user terminal. Alternatively, the processor and storage medium can reside in the user terminal as discrete components.

To sum up, the signal processing method and device for a memory system interface circuit provided by the embodiments of the present application use an improved DFE algorithm which can reduce the calibration time for DFE optimized filter coefficients from several seconds to several milliseconds, which significantly reduces the calibration time for the DFE during the initialization. Furthermore, since the calibration time for DFEs can be reduced significantly, the circuit system can be calibrated at a predetermined period according to actual requirements, to adjust the filter coefficients substantially in real time and effectively to compensate a drift due to the variation of temperature or voltage.

It should be noted that although several steps or modules of a signal processing method and device for a memory system interface circuit have been described in the previous paragraphs, such division is exemplary and not mandatory. Practically, according to the embodiments of the present disclosure, the functions and features of two or more modules described above may be embodied in one module. On the other hand, the functions and features of any one module described above may be embodied in two or more modules.

Various embodiments have been described herein with reference to the accompanying drawings. It will, however, be evident that various modifications and changes may be made thereto, and additional embodiments may be implemented, without departing from the broader scope of the invention as set forth in the claims that follow. Further, other embodiments will be apparent to those skilled in the art from consideration of the specification and practice of one or more embodiments of the invention disclosed herein. It is intended, therefore, that this application and the examples herein be considered as exemplary only, with a true scope and spirit of the invention being indicated by the following listing of exemplary claims.

The invention claimed is:

1. A signal processing method for a memory system interface circuit, wherein the memory system interface circuit comprises at least one signal pin each being configured to receive a transmission signal via an individual signal link and to generate a received signal at a receiving node of the signal link, and wherein the signal processing method comprises:

pre-processing the received signal to obtain an input signal;

removing a weighted feedback signal from the input signal to obtain an output signal, wherein the weighted feedback signal is provided by a finite impulse response (FIR) filter in a feedback path;

deciding on the output signal based on a predetermined base signal to generate a digital output signal;

weighting, on a scale of a filter coefficient matrix of the FIR filter, the digital output signal to obtain the weighted feedback signal;

comparing the output signal with a reference signal to generate an error signal; and determining a set of optimal filter coefficients of the filter coefficient matrix of the FIR filter and the reference signal according to correlation between the digital output signal and the error signal, to minimize inter-symbol interference (ISI) of the received signal introduced by transmission characteristics of the signal link, wherein determining a set of optimal filter coefficients of the filter coefficient matrix of the FIR filter and the reference signal according to correlation between the digital output signal and the error signal further comprises:

determining whether to update the reference signal according to signs of the digital output signal and the error signal at a current time moment; and updating the reference signal at a predetermined reference step according to an indication to update the reference signal.

2. The signal processing method of claim 1, wherein the pre-processing further comprises continuous time linear equalization, variable gain adjustment or the combination thereof.

3. The method of claim 1, wherein updating the reference signal at a predetermined reference step further comprises:

determining the reference signal using least mean square algorithm or sign-sign least mean square algorithm according to the digital output signal and the error signal.

4. The method of claim 3, wherein determining the reference signal using sign-sign least mean square algorithm further comprises updating the reference signal using the following equation:

$$dLev_{n+1} = dLev_n + u_{dLev} * \text{sign}(e_n) * \text{sign}(d_n)$$

wherein $dLev_{n+1}$ is an updated reference signal at the current time moment, $dLev_n$ is the reference signal before updating at the current time moment, $u_{dLev}$ is the predetermined reference step, $e_n$ is a value of the error signal at the current time moment, $d_n$ is a value of the digital output signal at the current time moment, and sign( ) refers to a mathematical sign function.

5. The method of claim 1, wherein the FIR filter comprises m stages, and m is a positive integer, and wherein determining a set of optimal filter coefficients of the filter coefficient matrix of the FIR filter and the reference signal according to correlation between the digital output signal and the error signal further comprises:

determining signs of ISI at k time moments prior to the current time moment according to correlation between a sign of the error signal at a current time moment and signs of the digital output signal at k time moments prior to the current time moment, and determining whether or not to update a filter coefficient of a $k^{th}$ stage of the FIR filter according to the determination of the signs of ISI at k time moments prior to the current time moment, wherein k is a positive integer smaller than or equal to m; and updating the filter coefficient of the $k^{th}$ stage at a predetermined filter step according to an indication to update the filter coefficient of the $k^{th}$ stage.

6. The method of claim 5, wherein updating the filter coefficient of the $k^{th}$ stage at a predetermined filter step further comprises:

determining the filter coefficient of the $k^{th}$ stage using least mean square algorithm or sign-sign least mean square algorithm according to the digital output signal and the error signal.

7. The method of claim 6, wherein determining the filter coefficient of the $k^{th}$ stage using sign-sign least mean square algorithm further comprises updating the filter coefficient using the following equation:

$$w[k]_{n+1} = w[k]_n + u_{dfe} * \text{sign}(e_n) * \text{sign}(d_{n-k})$$

wherein $w[k]_{n+1}$ is an updated filter coefficient of the $k^{th}$ stage at the current time moment, $w[k]_n$ is the filter coefficient of the $k^{th}$ stage before updating at the current time moment, $u_{dfe}$ is the predetermined filter step, $e_n$ is a value of the error signal at the current time moment, $d_{n-k}$ is a value of the digital output signal at k time moments prior to the current time moment, and sign( ) refers to a mathematical sign function.

8. The method of claim 1, wherein the transmission signal is a randomly generated signal or a pseudo random sequence.

9. The method of claim 1, wherein the method is repeated at a predetermined interval to re-determine the set of optimal filter coefficients of the filter coefficient matrix of the FIR filter and the reference signal.

10. The method of claim 1, wherein the memory system interface circuit is integrated in a memory interface of a memory controller.

11. The method of claim 1, wherein the memory system interface circuit is integrated in an interface of a memory module.

12. A signal processing device for a memory system interface circuit, wherein the memory system interface circuit comprises at least one signal pin each being configured to receive a transmission signal via an individual signal link and to generate a received signal at a receiving node of the signal link, and wherein the signal processing device comprises:

a pre-processing module configured for pre-processing the received signal to obtain an input signal;

a decision feedback equalizer (DFE) comprising an output path coupled with an output sampler and a feedback path coupled with a finite impulse response (FIR) filter; the DFE being configured for removing a weighted feedback signal from the input signal to obtain an output signal, and the output sampler being configured for deciding on the output signal based on a predetermined base signal to generate a digital output signal; wherein the weighted feedback signal is obtained by weighting on a scale of a filter coefficient matrix of the FIR filter the digital output signal;

an error sampler configured for comparing the output signal with a reference signal to generate an error signal; and an adaptive processing module configured for determining a set of optimal filter coefficients of the filter coefficient matrix of the FIR filter and the reference signal according to correlation between the digital output signal and the error signal, to minimize inter-symbol interference (ISI) of the received signal introduced by transmission characteristics of the signal link, wherein the adaptive processing module is further configured to determine a set of optimal filter coefficients of the filter coefficient matrix of the FIR filter and the reference signal according to correlation between the digital output signal and the error signal through:

determining whether to update the reference signal according to signs of the digital output signal and the error signal at a current time moment; and updating the reference signal at a predetermined reference step according to an indication to update the reference signal.

13. The signal processing device of claim 12, wherein the adaptive processing module is further configured to update the reference signal using the following equation:

$$dLev_{n+1} = dLev_n + u_{dLev} * \text{sign}(e_n) * \text{sign}(d_n)$$

wherein $dLev_{n+1}$ is an updated reference signal at the current time moment, $dLev_n$ is the reference signal before updating at the current time moment, $u_{dLev}$ is the predetermined reference step, $e_n$ is a value of the error signal at the current time moment, $d_n$ is a value of the digital output signal at the current time moment, and sign( ) refers to a mathematical sign function.

14. The signal processing device of claim 12, wherein the FIR filter comprises m stages, and m is a positive integer, and the adaptive processing module is further configured to determine the filter coefficient using the following equation:

$$w[k]_{n+1} = w[k]_n + u_{dfe} * \text{sign}(e_n) * \text{sign}(d_{n-k})$$

wherein $w[k]_{n+1}$ is an updated filter coefficient at the current time moment, $w[k]_n$ is the filter coefficient of the $k^{th}$ stage before updating at the current time moment, $u_{dfe}$ is the predetermined filter step, $e_n$ is a value of the error signal at the current time moment, $d_{n-k}$ is a value of the digital output signal at k time moments prior to the current time moment, and sign( ) refers to a mathematical sign function.

15. The signal processing device of claim 12, wherein the transmission signal is a randomly generated signal or a pseudo random sequence.

16. The signal processing device of claim 15, wherein the transmission signal is a pseudo random sequence generated by a circulating shift register.

17. The signal processing device of claim 12, wherein the adaptive processing module is configured to re-determine the filter coefficients of the FIR filter at a predetermined interval according to the transmission signal that is randomly generated.

18. A memory controller comprising the signal processing device of claim 12.

19. The memory controller of claim 18, wherein each signal pin of the memory controller comprises an individual signal processing device of claim 12.

20. The memory controller of claim 18, wherein the memory controller is a register clock driver or a data buffer.

21. A memory module comprising the signal processing device of claim 12.

22. The memory module of claim 21, wherein each signal pin of the memory module comprises an individual signal processing device of claim 12.

\*    \*    \*    \*    \*